United States Patent [19]

Jarret et al.

[11] 4,260,926
[45] Apr. 7, 1981

[54] VARIABLE RELUCTANCE ELECTRIC MOTOR WITH PROGRESSIVELY SATURABLE POLES

[75] Inventors: Jean Jarret, Paris; Jacques Jarret, Louveciennes, both of France

[73] Assignee: Societe Elpalux, Luxembourg, Luxembourg

[21] Appl. No.: 21,196

[22] Filed: Mar. 16, 1979

Related U.S. Application Data

[63] Continuation-in-part of Ser. No. 808,164, Jun. 20, 1977, abandoned.

[51] Int. Cl.³ .............................................. H02P 7/06
[52] U.S. Cl. .................................... 310/254; 310/163; 310/185
[58] Field of Search ............... 310/172, 185, 152, 197, 310/155, 198, 162, 75 R, 163, 261, 164, 262, 49, 264, 159, 267, 269, 208, 190, 216; 318/138, 254

[56] References Cited

U.S. PATENT DOCUMENTS

| | | | |
|---|---|---|---|
| 3,401,322 | 9/1968 | O'Regan | 310/49 R |
| 3,435,266 | 3/1969 | Jarret | 310/164 |
| 3,740,630 | 6/1973 | Jarret | 310/163 |
| 3,801,833 | 4/1974 | Leitgeb | 318/254 |
| 3,875,437 | 4/1975 | Hara | 310/49 R |
| 3,995,203 | 11/1976 | Török | 310/163 |
| 4,081,724 | 3/1978 | Jarret | 318/138 |
| 4,110,672 | 8/1978 | Deplante | 318/254 |

Primary Examiner—R. Skudy
Attorney, Agent, or Firm—Abraham A. Saffitz

[57] ABSTRACT

A variable-reluctance electric motor with teeth of uniform pitch and poles whose number is a multiple of 4, which includes means for varying the magnetic permeability of the poles in dependance upon the relative positions of the poles and teeth from a zero value to saturation value reached when a tooth faces the middle portion of a pole, passing through intermediate values when a tooth faces the edge portions of a pole. In a first embodiment, the poles are made up of a mixture of magnetic and non-magnetic material, the ratio of magnetic material to non-magnetic material decreasing from the middle portion of the pole to the edge portions. In a second embodiment, the poles are distributed in sectors each containing a central pole and two equal numbers of lateral poles. In a sector, the pitch of the poles is non-uniform, the pitch of the lateral poles being slightly less than the pitch of the teeth.

3 Claims, 6 Drawing Figures

VARIABLE RELUCTANCE ELECTRIC MOTOR WITH PROGRESSIVELY SATURABLE POLES

CROSS REFERENCE TO RELATED APPLICATION

This application is a continuation-in-part of our prior application, Ser. No. 808,164, filed June 20, 1977, now abandoned.

BACKGROUND OF THE INVENTION

1. Field of the Invention

This invention relates to a variable-reluctance electric driving motor comprising a stator ring made up of magnetic laminations and provided with poles surrounded by induction coils and distributed in four groups of the same number, a rotor ring made also of magnetic laminations and provided with teeth of uniform pitch cooperating with said poles.

The relative positions of the poles of the stator with respect to the rotor teeth are shifted by 1, 2, 3, 4 quarters of the tooth pitch or a multiple thereof in respectively the first, second, third, fourth group, induction coils surrounding the poles of each group. Means are provided for feeding the induction coil means of each group with a four-phase current to obtain the magnetic saturation of each pole when, during the rotation of the rotor, at least a portion of a tooth is facing said pole.

In order to obtain the four-phase current from a D.C. source the feeding means comprise switching means controlled by the position of the rotor and connected to the induction coil means so that, during a cycle corresponding to any one rotor advance through a tooth pitch, each stator pole is subjected to two supply switching operations in opposite directions, said switching operations being offset by a quarter cycle from one group to the next.

2. Description of the prior art.

U.S. Pat. No. 3,435,266 issued Mar. 25, 1969 to the present Applicants, in particular, has already disclosed a first motor of the kind concerned in which the stator poles, provided with individual coils, are spread out with a constant pitch so that four consecutive poles belong to the said four groups respectively, and in which the rotor teeth are of an odd multiple number of one-quarter of that of the stator poles.

U.S. Pat. No. 3,740,630 issued June 19, 1973 to the present Applicants also discloses a second motor of the kind in which the stator comprises a number 4 m (m≧2) of identical sectors, in each of which the stator poles of number p are uniformly distributed with the pitch of the rotor teeth and grouped together by a single sector coil, two consecutive sectors being spaced apart by an angle such that from one to the other the teeth of the rotor recede (with respect to the direction of movement) by one-quarter of the said tooth pitch or an odd multiple n of said quarter-pitch. It will readily be seen that, in this case, the number of rotor teeth is m (4 p+n).

The characteristics of the variable-reluctance electric motors of these two patents can be summarized as follows:

| | U.S. Pat. No. 3,435,266 | U.S. Pat. No. 3,740,630 |
|---|---|---|
| Number of sectors | 4m | m |
| Number of stator poles | 4mp | 4m |
| Number of rotor teeth | $4m(p + \frac{n}{4})$ | mn |
| | The pole pitch is constant per sector and equal to the tooth pitch and the sectors are specially phase shifted with respect to one another. There is a winding per sector. | The pole pitch is constant all around the stator. There is a winding per pole. |

In the present invention the pole pitch is not constant in the sectors.

In the motors of both types, the saturation means for the magnetic circuits are based on the fact that each rotor tooth has, in the peripheral direction and as from the air gap, a central region of maximum magnetic material density in radial section symmetrically framed by two marginal zones in which the said magnetic material density decreases progressively generally discontinuously towards the leading and trailing edges of the tooth.

This procedure has the effect of "modulating" the effective back emf in each stator coil per unit of time in the manner indicated hereinabove.

However, it has been found that the presence of a magnetically saturable zone in the toothed part of the rotor adjacent the air gap but situated outside the stator zone carrying the coils results in the formation of leakage flux, and this results in some limitation of the flux variations inside these coils and hence reduced power and efficiency.

SUMMARY OF THE INVENTION

The object of the invention is to obviate these conditions. To this end, a variable-reluctance driving motor of the kinds defined above is characterized according to the invention in that the said magnetic circuit saturation means are embodied by the stator poles. Progressivity of the variations of the magnetic permeability is obtained by means of the conformation of the stator poles.

The magnitude of the gains obtained in respect of torque and output as a result of the reduction of the leakage flux will be indicated hereinafter.

The variable-reluctance electric driving motor of the invention is characterized in that the poles in each group of poles are conformed so that, during the rotation of the rotor, the mean magnetic permeability of said poles increases substantially linearly before the magnetic permeabilities of all said poles reach the magnetic saturation and decreases substantially linearly after the mean magnetic permeability of all said poles have reached the magnetic saturation.

In a first embodiment corresponding to the first type of motor aforementioned, it is not the rotor teeth which have a progressive and symmetrical magnetic metal density reduction from a central region towards the edges, as in the prior art, but the stator poles which are designed similarly. The progressive reduction of the magnetic metal density towards the edges of the poles has the additional advantage that the flux variations in the conductors of the coils near the air-gap are reduced and the eddy current losses resulting are diminished.

In a second embodiment corresponding substantially to the second type of motor aforementioned, the same effect is obtained without magnetic metal density reduction, by suitable staggering the positions of the stator poles in each sector as from the positions in the prior art corresponding to a uniform pitch equal to the tooth pitch.

If the motor of the invention belongs to the type wherein successive poles around the rotor respectively pertain to the four groups of poles, the poles in each group having an uniform pitch and the induction coil means of each group comprising as many induction coils as poles in said group, each induction coil surrounding one pole, each pole of the stator, according to the invention, is conformed so that the density of magnetic material is less in the edge portions than in the central portion.

If the motor of the invention belongs to the type wherein each group of poles comprises at least one sector of poles each including a plurality of consecutive poles comprising at least one central pole and lateral poles, the induction coil means of each group of poles comprising as many induction coils as sectors in said poles, each induction coil surrounding all the poles of one sector, the poles are conformed in each sector, according to the invention, so that the pitch of the lateral poles is slightly less than the tooth pitch.

BRIEF DESCRIPTION OF THE DRAWINGS

The invention will be more readily understood from the following description of two exemplified embodiments and the accompanying drawings wherein.

DESCRIPTION OF THE PREFERRED EMBODIMENTS

Figure 1:
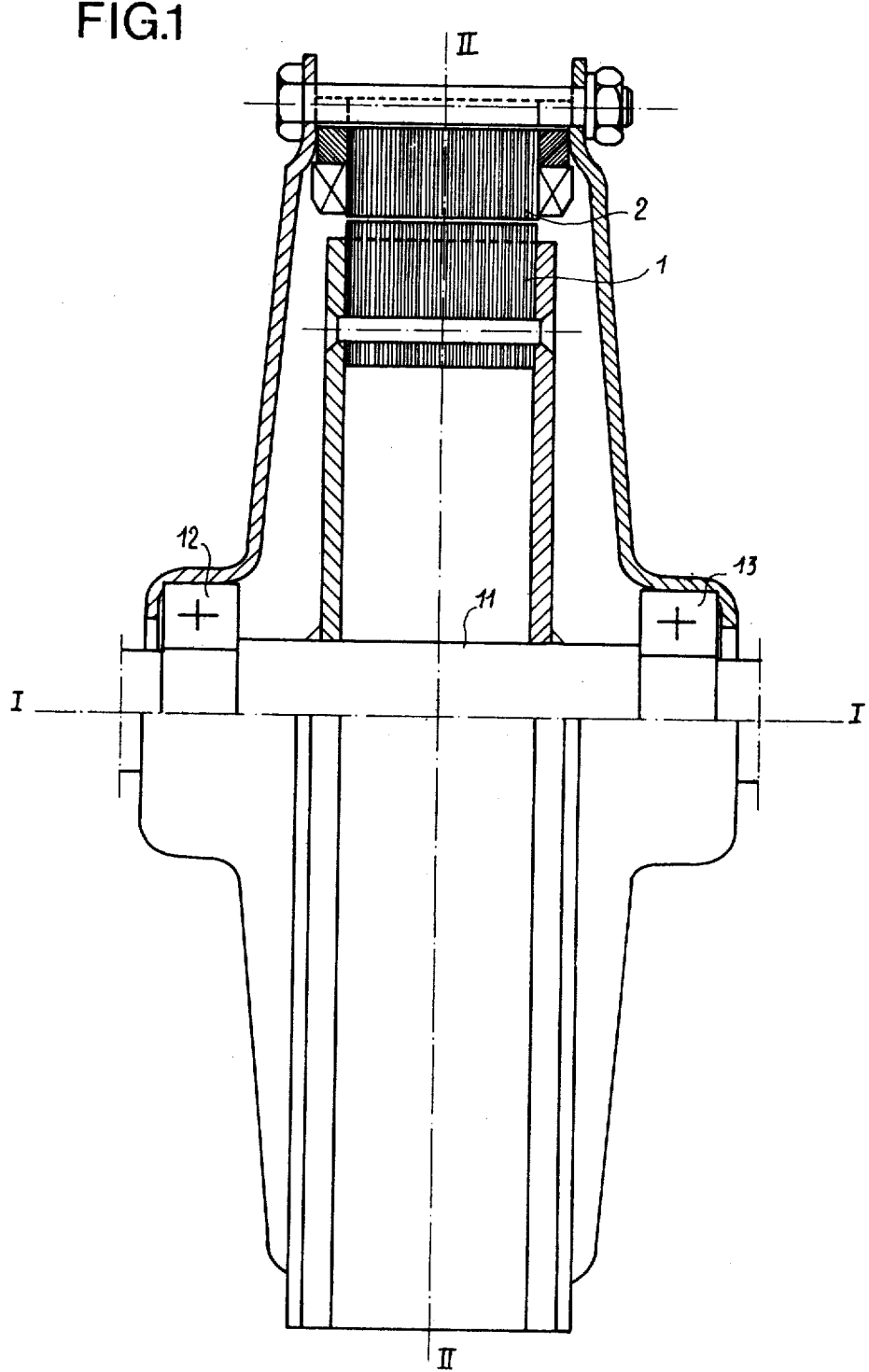
FIG. 1 is an axial section of a variable-reluctance motor according to the invention.

Referring to FIG. 1, a variable-reluctance motor according to the invention has a geometric axis of revolution I—I and a plane of symmetry II—II perpendicular to said axis. A rotor 1 (see also FIG. 2) connected to a shaft 11 mounted on bearings 12, 13 comprises, in particular, a ring made up of laminations of magnetic material, e.g. silicon-iron laminations. Teeth, e.g. 101, project from the cylindrical peripheral surface of this ring into the gap between the stator and rotor. These rotor teeth of substantially parallelepipedal shape, are of constant pitch and the peripheral length of each tooth is between one-third and one-half of said pitch.

A stator 2 (see also FIG. 2) comprises, in particular, an inner laminated ring, consisting at least partly of magnetic material, e.g. silicon-iron plates. Poles, e.g. 201, each also of substantially parallelepipedal shape, project from the cylindrical under-surface of this ring into the gap between the stator and rotor.

In a first embodiment (FIG. 2) of a motor according to the invention, the number of poles on the stator is $4m=16$ where from $m=4$ and the number of teeth on the rotor is $nm=20$ where from $n=5$. The stator poles and the rotor teeth are of a constant pitch. Each of these poles is surrounded by an individual winding, e.g. poles 201 is surrounded by winding 211.

Figure 3:
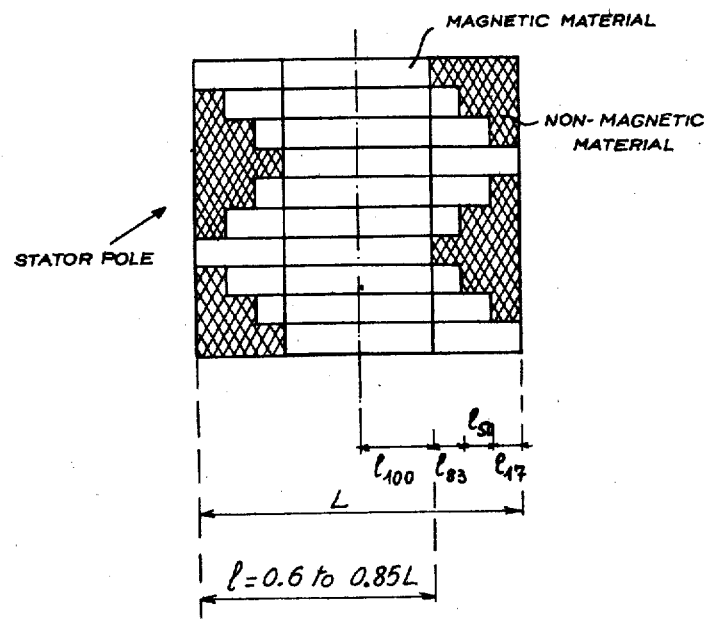
FIG. 3 is a partial section of a pole along the line III—III of FIG. 2.

The plates making up the stator are cut out, e.g. as shown in FIG. 3, so that the magnetic material density of the order of 100% in a central region of length $2 l_{100}$ decreases symmetrically in each pole by steps, passing to about 83% over a total length $2 l_{83}$, about 50% over $2 l_{50}$ and about 17% over $2 l_{17}$.

The ratios of the dimensions between the poles and the teeth are so selected that in each pole, i.e. inside the corresponding winding, the magnetic flux produced by the current in said winding varies between practically zero when the pole in question is centered on a rotor inter-teeth interval and a maximum when the same pole is centered on a rotor tooth; more specifically, the derivative of this flux with respect to time (corresponding to the back emf developed in the winding) is—as known from the aforesaid patents—of alternate trapezoidal configuration with flat zeros and crests.

If L designates the circumferential length of the pole and l the circumferential length of a pole lamination, the ratio l/L is comprised between 60 and 85%.

| If l/L = 0.6: | |
|---|---|
| $l_{100} = 0.1 L$ | $l_{83} = l_{50} = l_{17} = 0.133 L$ |
| If l/L = 0.85 | |
| $l_{100} = 0.35$ | $l_{83} = l_{50} = l_{17} = 0.05 L$ |

The operation of the motor may be described as follows (see also FIG. 5).

Figure 2:
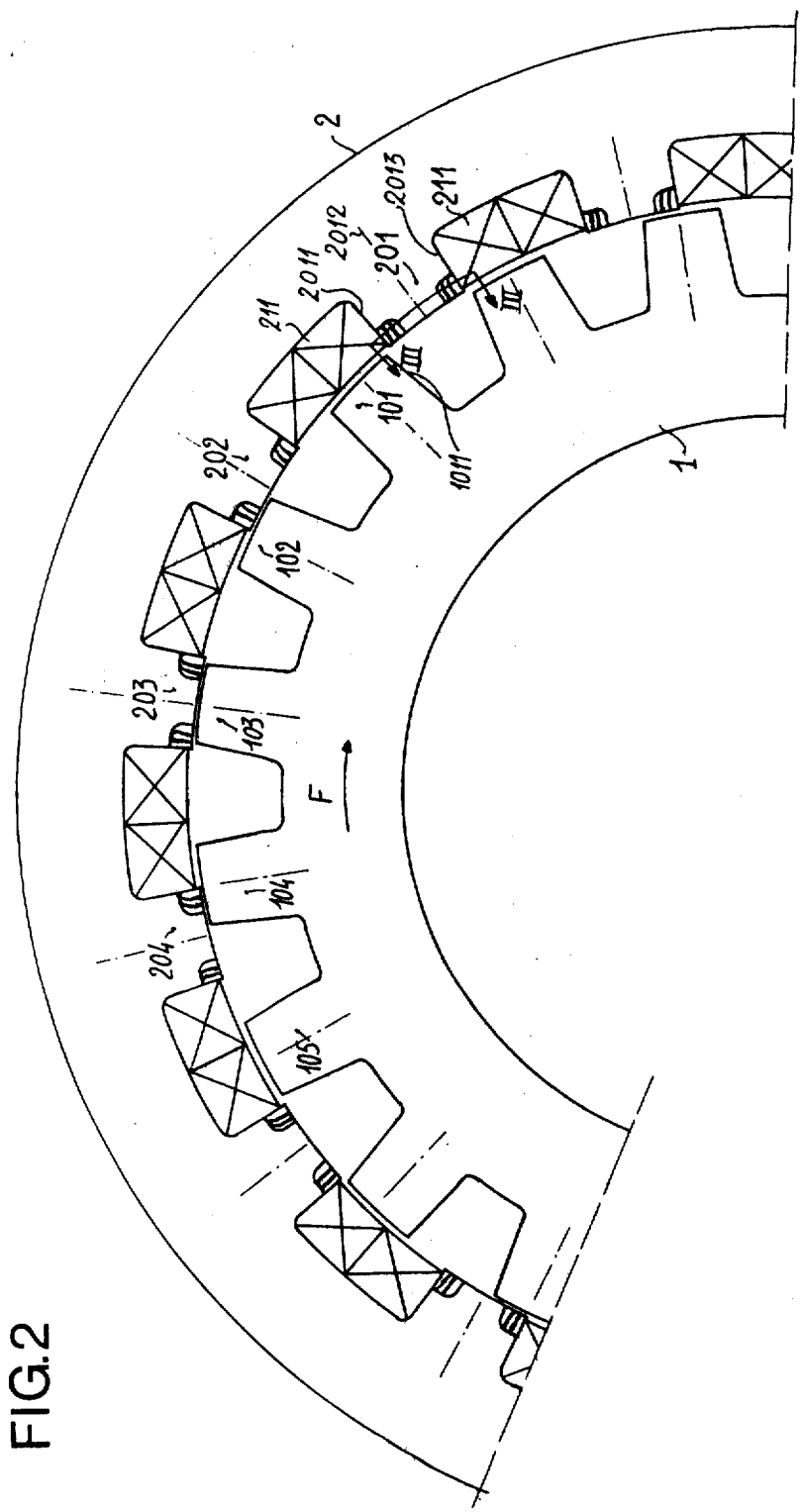
FIG. 2 is a cross-section along the plane II—II of FIG. 1, of a motor according to the invention (first example)

Referring to FIG. 2, pole 201 is shown at a time $T_0$ when the leading edge 1011 (in the direction F of movement of the rotor) of tooth 101 is just reaching the left hand side 2011 of the pole, and in these conditions the effective elementary back emf in the corresponding winding 211 has a zero value.

After time $t_0$ when the leading edge 1011 of the tooth 101 advances with respect to the left-hand side 2011 of pole 201 (referring to FIG. 2), where the magnetic metal density is reduced, the back emf in the winding increases to a substantially rectilinear configuration, until the time $t_0'$ when it reaches a step of maximum value, the leading edge 1011 of the tooth facing the central part 2012 of the pole having the high magnetic metal density.

At the time $t_1$ when the leading edge 1011 of the tooth 101 advances with respect to the right-hand side 2013 of the pole 201, again with reduced magnetic metal density, the back emf decreases to a substantially symmetrical configuration with respect to the previous configuration, until time $t_1'$ when a zero value step is reached.

Figure 5:
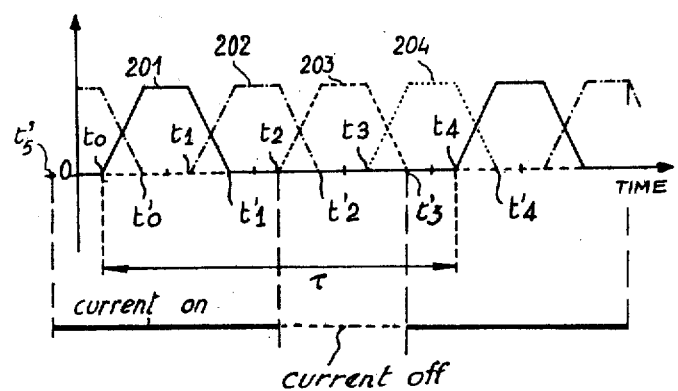
FIG. 5 is a diagram showing the variations in the effective elementary back emf's in the different stator coils of the motor of FIGS. 2 and 3.

The coil 211 of pole 201 is supplied with current when the back emf is zero, that is theoretically from $t_0$ to $t_1'$ (see FIG. 5). Due to the current establishmment and cut off delay, the coil is supplied with current from $t_5'$ to $t_2$ and it is disconnected from the current source from $t_2$ to $t_3'$.

All of the poles of order $(201+4 k)$ (K being an integer between 0 and $(m-1)$, limits included) are supplied just like the pole 201 and their elementary back emf will develop with respect to time in the same way as that of pole 201.

On the other hand, the poles of number $(202+4 k)$, $(203+4 k)$, $(204+4 k)$ have a back emf time variation like that of the poles $(201+4 k)$, but with phase shifts of ¼, ½ and ¾ cycle respectively, i.e. with delay T/4, T/2 and 3T/4, T being the cycle of the pole supply.

Consequently, the total back emf, equal to the sum of the four elementary back emf's thus described, retains a substantially constant value as does also the motor torque as a result.

Certain dimensional limitations in respect of the circumferential lengths of the poles and teeth must be complied with, because the length of a tooth must lie between the average length of the laminations of a pole (0.6 L to 0.85 L) and the total length L of a pole. Of course, the length of a tooth interval must be greater than that of the pole, and the length of a pole interval must be greater than that of a tooth.

In a second embodiment of a motor according to the invention, an example of which will be described with reference to FIGS. 4A and 4B, the stator has a number of 4XmXp poles distributed over 4Xm sectors of p consecutive poles each where where m is at least equal to two. In each sector, the p poles are symmetrical two by two with respect to the sector bisector and form on each side of said bisector two poles arrangements of p/2 poles each. In each arrangement, the pitch between the poles is substantially equal to the rotor tooth pitch, for example d minus a small increment $\epsilon$ while the pitch between the poles of the two arrangements near the bisector is equal to the rotor tooth pitch d plus (p/2−1) times said increment $\epsilon$. The 4m sectors form 4 groups of m sectors and the relative positions of the sectors of the first, second, third and fourth sector group with respect to the rotor teeth are shifted by 1, 2, 3 and 4 quarters of the tooth pitch respectively. There are as many induction coils as there are sectors, and each induction coil surrounds all of the poles of one sector. Feeding means feed the induction coils of the 4 sector groups with a phase of a four-phase current to obtain magnetic saturation of each pole during the rotation of the rotor when at least a portion of a tooth faces the pole.

Figure 4A:
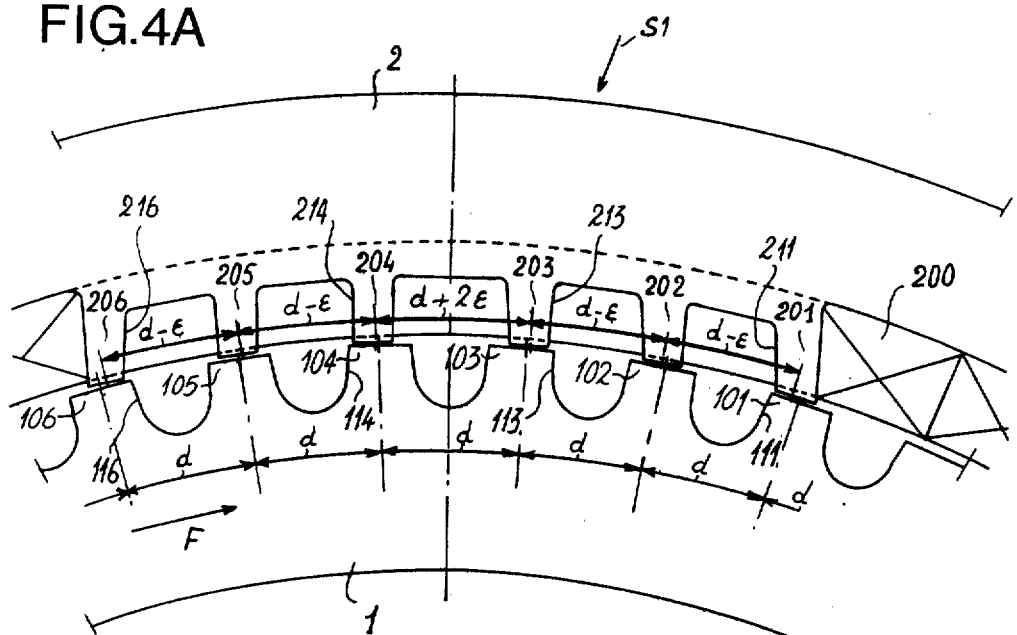
FIGS. 4A and 4B are cross-sections along the plane II—II of FIG. 1 also of a motor according to the invention (second example) corresponding respectively to two different positions of the rotor.
Figure 4B:
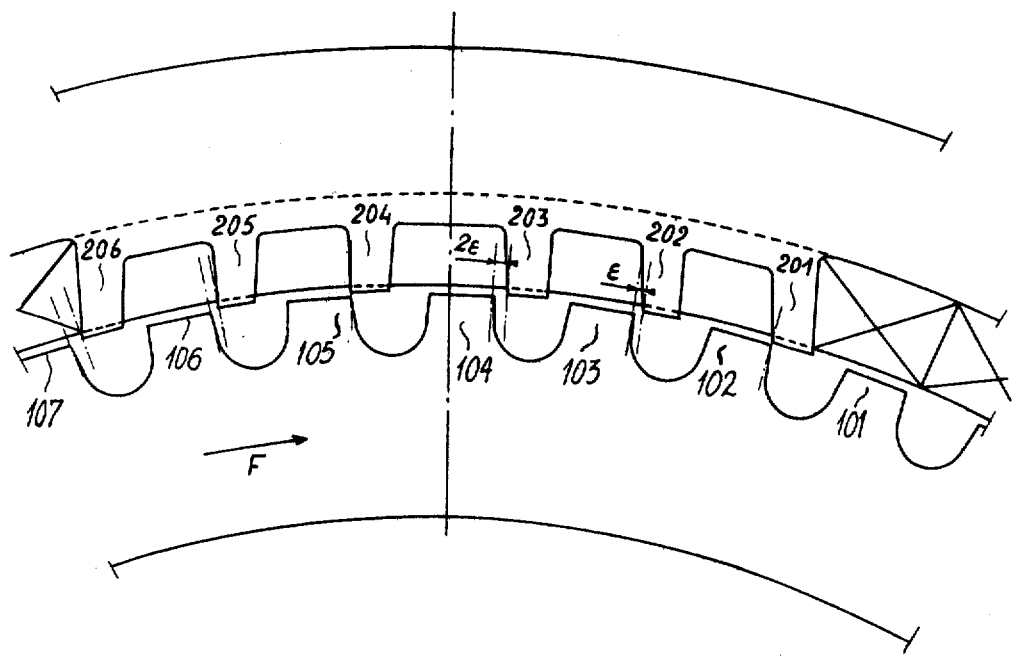

In the example of FIG. 4A and 4B, the values of the parameters m and p are 2 and 6 respectively. Consequently, the stator has 4XmXp=48 poles distributed over 4Xm=8 sectors of p=6 poles each. Each sector is surrounded by a single sector winding, e.g. poles 201=206 of sector S1 are surrounded by winding 200. The rotor has fifty-four teeth. Both arrangements of each sector each include p/2=3 poles.

Two consecutive sectors are spaced apart by the angle such that the rotor teeth recede, with respect to the direction of movement, by an odd multiple of one-quarter of the tooth pitch, i.e., in the present case, three-quarters of the tooth pitch. The sector poles e.g. 201-206, are of uniform circumferential length and they do not present any reduction of magnetic metal at the edges. Their length is less by 4 to 20% than the similar length of the rotor teeth and their pitch is not uniform.

If we consider sector S1, for example, it will be seen that with the rotor position shown in FIG. 4A, the stator poles 202, 205 in the right-hand and left-hand half-sectors respectively are centered on the rotor teeth 101, 105 while the poles 201, 203 on the one hand, and 204, 206 on the other hand, are offset with respect to the neighbouring teeth, respectively 101, 103 and 104, 106, symmetrically with respect to pole 202 as regards poles 201 and 203 and symmetrically with respect to pole 205 as regards poles 204 and 206, so that these poles 201, 203; 204, 206 have their edges 211, 213; 214, 216 which face the poles 202, 205 respectively substantially in line with the edges 111, 113; 114, 116 of the teeth 101, 103, 104, 106 which cover them. Consequently, if we call the interval between the tooth axes d, the interval between the poles axes is equal to:

(d−$\epsilon$) between the poles 201 and 202 and between the poles 206 and 205, (d−$\epsilon$) between the poles 203 and 202 and between the poles 204 and 205, (d+2$\epsilon$) between the poles 203 and 204.

As a result of the offsetting of the stator poles with respect to the tooth pitch, when the tooth 102 reaches the pole 201 by its leading edge (in the direction of rotation indicated by arrow F), with the rotor position shown in FIG. 4B, the next tooth 103 in the direction of movement is lagging behind the pole 202 by a length $\epsilon$, the next tooth 104 is lagging behind the pole 203 by 2$\epsilon$, the next tooth 105 having zero lag with respect to pole 204, and so on.

The stator poles are thus covered by the rotor teeth progressively from a given pole to a certain number of poles following it in the direction of movement. More precisely, if tooth 102 intercepts a fraction 3$\epsilon$ of the length of pole 201, tooth 103 will intercept a fraction 2$\epsilon$ of the length of pole 202 and tooth 104 will intercept a fraction $\epsilon$ of the length of pole 203. This obviously gives substantially the same results in respect of the back emf produced in the common sector winding as if the poles had reduced metal density at their edges.

From the above description it will be seen that $\epsilon$ must be between certain limits. If we call the reduction percentage of the circumferential length of the pole with respect to that of a tooth r%, the necessity for the stator to have all its poles covered at least partially by the rotor teeth entails that $\epsilon$ must be at most r/2 times the length of a tooth. The bottom limit of $\epsilon$ can be a value equal to half the previous value, i.e. r/4.

This procedure can be applied generally by dividing each stator sector not into two half-sectors, but into f equal subsectors each consisting of an uneven number g of poles, and progressively and symmetrically bringing the poles close to the central pole in each of the sub-sectors, within limits similar to those of the example given above which corresponds to f=2, g=3.

The switching means for feeding the sector coils is identically the same as that disclosed in relation to FIGS. 3 and 4 of U.S. Pat. No. 3,740,630 above referred to, in which the stator has spatially equidistributed poles. In this Patent, the number of sector coil is 8 and the number of poles by sector is 6 as in the present invention, but the number of teeth is 50 instead of 54 in the present example due to the difference in spatial lag of the sectors which is ⅛ of the tooth pitch in the example of the prior art patent and ¾ of the tooth pitch in the present example.

With the features provided by the invention, in both types of motors the maximum torque is increased by about 15 to 20%, all other things beings equal in respect of a prior art motor, and the output is increased by about 5-10%.

What we claim is:

1. A variable-reluctance electric driving motor of the kind comprising:
   a rotor member made up of magnetic material laminations and having a plurality of teeth of uniform pitch projecting therefrom;
   a stator member which defines a gap with said rotor member into which gap said rotor teeth project;
   said stator member made up of magnetic material laminations and having a plurality of poles projecting therefrom and distributed in 4m sectors, m being equal at least to two, each sector including a plurality of p consecutive poles, said poles being two by two symmetrical with respect to the sector bisector and forming on each side of said bisector two pole arrangements of p/2 poles each, the pitch between the poles in each arrangement being equal to the rotor tooth pitch minus a small increment and the pitch between the poles of the two arrangements nearby the bisector being equal to the rotor tooth pitch plus (p/2−1) times said increment;

the 4m sectors forming 4 groups of m sectors and the relative positions of the sectors of the first second, third and fourth sector group with respect to the rotor teeth being shifted by 1, 2, 3, 4 quarters of the tooth pitch respectively;

as many induction coils as sectors, each induction coil surrounding all of the poles of one sector; and means for feeding the induction coils of the 4 sector groups with a phase of a four-phase current to obtain magnetic saturation of each pole during the rotation of the rotor when at least a portion of a tooth is facing said pole.

2. A variable-reluctance electric driving motor comprising:

a rotor member amde up of magnetic material laminations and having fifty four teeth of uniform pitch projecting therefrom;

a stator member which defines a gap with said rotor member into which gap said rotor teeth poject;

said stator member made up of magnetic material laminations and having forty-eight poles projecting therefrom and distributed in eight sectors of six poles each, said six poles being two by two symmetrical with respect to the sector bisector and forming on each side of said bisector two pole arrangements each comprising a first, a second and a third pole, the pitch between the first and second pole and the second and third pole in each arrangement being equal to the rotor tooth pitch minus a small increment and the pitch between the first pole of the two arrangments being equal to the rotor tooth pitch plus two times said increment;

the eight sectors forming 4 groups of 2 sectors and the relative positions of the sectors of the first, second, third and fourth group with respect to the rotor teeth being shifted by 1, 2, 3, 4 quarters of the tooth pitch respectively;

eight induction coils, each surrounding one sector; and means for feeding each induction coil with a phase of a four-phase current to obtain magnetic saturation of each pole during the rotation of the rotor when at least a portion of a tooth is facing said pole.

3. A variable-reluctance electric driving motor of the kind comprising:

a rotor member made up of magnetic material laminations and having a plurality of teeth of uniform pitch projecting therefrom;

a stator member which defines a gap with said rotor member into which gap said rotor teeth project;

said stator member made up of magnetic material laminations and having a plurality of poles projecting therefrom and distributed in 4m sectors, m being equal at least to two, each sector being divided into f sub-sectors of equal angular development by radii and including a plurality of p consecutive poles, said poles being two by two symmetrical with respect to said radii and forming in each sub-sector a pole arrangement of p/f poles each, the pitch between the poles in each arrangement being equal to the rotor tooth pitch minus a small increment and the pitch between the poles of two arrangements nearby a radius being equal to the rotor pitch plus (p/f−1) times said increment;

the 4m sectors forming 4 groups of m sectors and the relative positions of the sectors of the first, second, third and fourth sector group with respect to the rotor teeth being shifted by 1, 2, 3, 4 quarters of the tooth pitch respectively;

as many induction coils as sectors, each induction coil surrounding all of the poles of one sector; and means for feeding the induction coils of the 4 sector groups with a phase of a four-phase current to obtain magnetic saturation of each pole during the rotation of the rotor when at least a portion of a tooth is facing said pole.

* * * * *